(12) United States Patent
Chuong

(10) Patent No.: US 11,193,593 B2
(45) Date of Patent: Dec. 7, 2021

(54) HYDROSTATIC SEAL

(71) Applicant: United Technologies Corporation, Farmington, CT (US)

(72) Inventor: Conway Chuong, Manchester, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 176 days.

(21) Appl. No.: 16/558,900

(22) Filed: Sep. 3, 2019

(65) Prior Publication Data

US 2021/0062918 A1    Mar. 4, 2021

(51) Int. Cl.
| F01D 11/04 | (2006.01) |
| F16J 15/44 | (2006.01) |
| F16J 15/34 | (2006.01) |
| F01D 11/00 | (2006.01) |

(52) U.S. Cl.
CPC ........... F16J 15/442 (2013.01); F16J 15/348 (2013.01); F16J 15/3468 (2013.01); F01D 11/003 (2013.01)

(58) Field of Classification Search
CPC ...... F16J 15/3468; F16J 15/348; F16J 15/442; F01D 11/003
See application file for complete search history.

(56) References Cited

U.S. PATENT DOCUMENTS

| 10,184,347 | B1  | 1/2019  | D-Ambruoso            |
| 10,221,714 | B2  | 3/2019  | Peters et al.         |
| 2016/0069269 | A1 | 3/2016  | Hyland et al.         |
| 2017/0211402 | A1 | 7/2017  | Peters et al.         |
| 2017/0248236 | A1* | 8/2017 | Simpson ........ F16J 15/447 |
| 2018/0363562 | A1 | 12/2018 | Chuong et al.         |
| 2019/0017607 | A1 | 1/2019  | Chuong et al.         |
| 2019/0093495 | A1 | 3/2019  | Chuong et al.         |

FOREIGN PATENT DOCUMENTS

WO    2014143284 A1    9/2014

OTHER PUBLICATIONS

Extended European Search Report; EP Application No. 20184064.2-1004; dated Jan. 11, 2021; 6 pages.

* cited by examiner

*Primary Examiner* — Gilbert Y Lee
(74) *Attorney, Agent, or Firm* — Cantor Colburn LLP

(57) ABSTRACT

A hydrostatic seal assembly includes a primary seal configured to maintain a selected gap between the primary seal and a rotating component. The primary seal includes a seal support, a seal shoe, and one or more seal beams operably connecting the seal support to the seal shoe. The one or more seal beams are configured as spring elements integral with the seal shoe to allow radial movement of the seal shoe relative to the seal support. A seal carrier including a radial outer wall is configured to radially position the primary seal. The seal carrier is configured for a non-contact relationship with the seal shoe during operation of the hydrostatic seal assembly.

17 Claims, 4 Drawing Sheets

HYDROSTATIC SEAL

STATEMENT OF FEDERAL SUPPORT

This invention was made with Government support awarded by the United States. The Government has certain rights in the invention.

BACKGROUND

Exemplary embodiments pertain to the art of gas turbine engines, and more particularly to seal assemblies for gas turbine engines.

In a gas turbine engine, a number of components rotate under tight tolerances about an engine central longitudinal axis relative to static components. For example, the compressor and turbine sections of the gas turbine engine include rotating rotors with rotor blades extending radially outward. The rotor rotates relative to a stator with a small annular gap therebetween. To increase efficiency of the gas turbine engine, it is important that such small gaps be maintained to limit leakage through the gap, but to also allow for rotation of the rotor relative to the stator.

Seals are often utilized to manage leakage through the gaps. Such seals are typically fixed to static components and may be contact seals, such as labyrinth or brush seals, while others may be non-contact seals such as hydrostatic seals. Some hydrostatic seals are configured with a shoe having radial travel in response to a pressure differential across the seal.

A hydrostatic seal typically includes a seal carrier, which holds the internal seal components together and in place for assembly into the engine. The seal carrier typically includes an aft plate, which is utilized to axially retain the shoe and prevent axial deflection of the shoe during operation. During operation, the shoe rubs against the aft plate, resulting in wear to the shoe and to the aft plate. Further, the friction between the shoe and the aft plate may cause the shoe to be less responsive in the radial direction to aerodynamic loads or cause the shoe to bind and become unresponsive.

BRIEF DESCRIPTION

In one embodiment, a hydrostatic seal assembly includes a primary seal configured to maintain a selected gap between the primary seal and a rotating component. The primary seal includes a seal support, a seal shoe, and one or more seal beams operably connecting the seal support to the seal shoe. The one or more seal beams are configured as spring elements integral with the seal shoe to allow radial movement of the seal shoe relative to the seal support. A seal carrier including a radial outer wall is configured to radially position the primary seal. The seal carrier is configured for a non-contact relationship with the seal shoe during operation of the hydrostatic seal assembly.

Additionally or alternatively, in this or other embodiments an aft wall extends radially inwardly from the radial outer wall.

Additionally or alternatively, in this or other embodiments the aft wall does not extend radially inwardly to a seal shoe radial position.

Additionally or alternatively, in this or other embodiments the radial outer wall and the aft wall are formed as a single unitary component.

Additionally or alternatively, in this or other embodiments the aft wall is positioned at a first axial end of the seal support and a secondary seal is positioned at a second end of the seal support opposite the first axial end.

Additionally or alternatively, in this or other embodiments the seal carrier is configured for a non-contact relationship with one or more seal beams during operation of the hydrostatic seal assembly.

Additionally or alternatively, in this or other embodiments one or more stops are formed in the seal shoe configured to limit radial travel of the seal shoe.

In another embodiment, a turbine section of a gas turbine engine includes a turbine stator, a turbine rotor configured to rotate about an engine central longitudinal axis relative to the turbine stator, and a hydrostatic seal assembly fixed to the turbine stator. The hydrostatic seal assembly includes a primary seal configured to maintain a selected gap between the primary seal and the turbine rotor. The primary seal includes a seal support, a seal shoe, and one or more seal beams operably connecting the seal support to the seal shoe. The one or more seal beams are configured as spring elements integral with the seal shoe to allow radial movement of the seal shoe relative to the seal support. A seal carrier includes a radial outer wall configured to radially position the primary seal. The seal carrier is configured for a non-contact relationship with the seal shoe during operation of the hydrostatic seal assembly.

Additionally or alternatively, in this or other embodiments an aft wall extends radially inwardly from the radial outer wall.

Additionally or alternatively, in this or other embodiments the aft wall does not extend radially inwardly to a seal shoe radial position.

Additionally or alternatively, in this or other embodiments the radial outer wall and the aft wall are formed as a single unitary component.

Additionally or alternatively, in this or other embodiments the aft wall is located at a first axial end of the seal support and a secondary seal is located at a second end of the seal support opposite the first axial end.

Additionally or alternatively, in this or other embodiments the seal carrier is configured for a non-contact relationship with one or more seal beams during operation of the hydrostatic seal assembly.

Additionally or alternatively, in this or other embodiments one or more stops are formed in the seal shoe and are configured to limit radial travel of the seal shoe.

In another embodiment, a gas turbine engine includes a combustor, and a turbine section in fluid communication with the combustor. The turbine section includes a turbine stator, a turbine rotor configured to rotate about an engine central longitudinal axis relative to the turbine stator, and a hydrostatic seal assembly configured to seal between the turbine rotor and the turbine stator. The hydrostatic seal assembly includes a primary seal configured to maintain a selected gap between the primary seal and the turbine rotor. The primary seal includes a seal support, a seal shoe, and one or more seal beams operably connecting the seal support to the seal shoe. The one or more seal beams are configured as spring elements integral with the seal shoe to allow radial movement of the seal shoe relative to the seal support. A seal carrier includes a radial outer wall configured to radially position the primary seal. The seal carrier is configured for a non-contact relationship with the seal shoe during operation of the hydrostatic seal assembly.

Additionally or alternatively, in this or other embodiments an aft wall extends radially inwardly from the radial outer wall.

Additionally or alternatively, in this or other embodiments the aft wall does not extend radially inwardly to a seal shoe radial position.

Additionally or alternatively, in this or other embodiments the radial outer wall and the aft wall are formed as a single unitary component.

Additionally or alternatively, in this or other embodiments the aft wall is located at a first axial end of the seal support and a secondary seal is located at a second end of the seal support opposite the first axial end.

Additionally or alternatively, in this or other embodiments the seal carrier is configured for a non-contact relationship with one or more seal beams during operation of the hydrostatic seal assembly.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
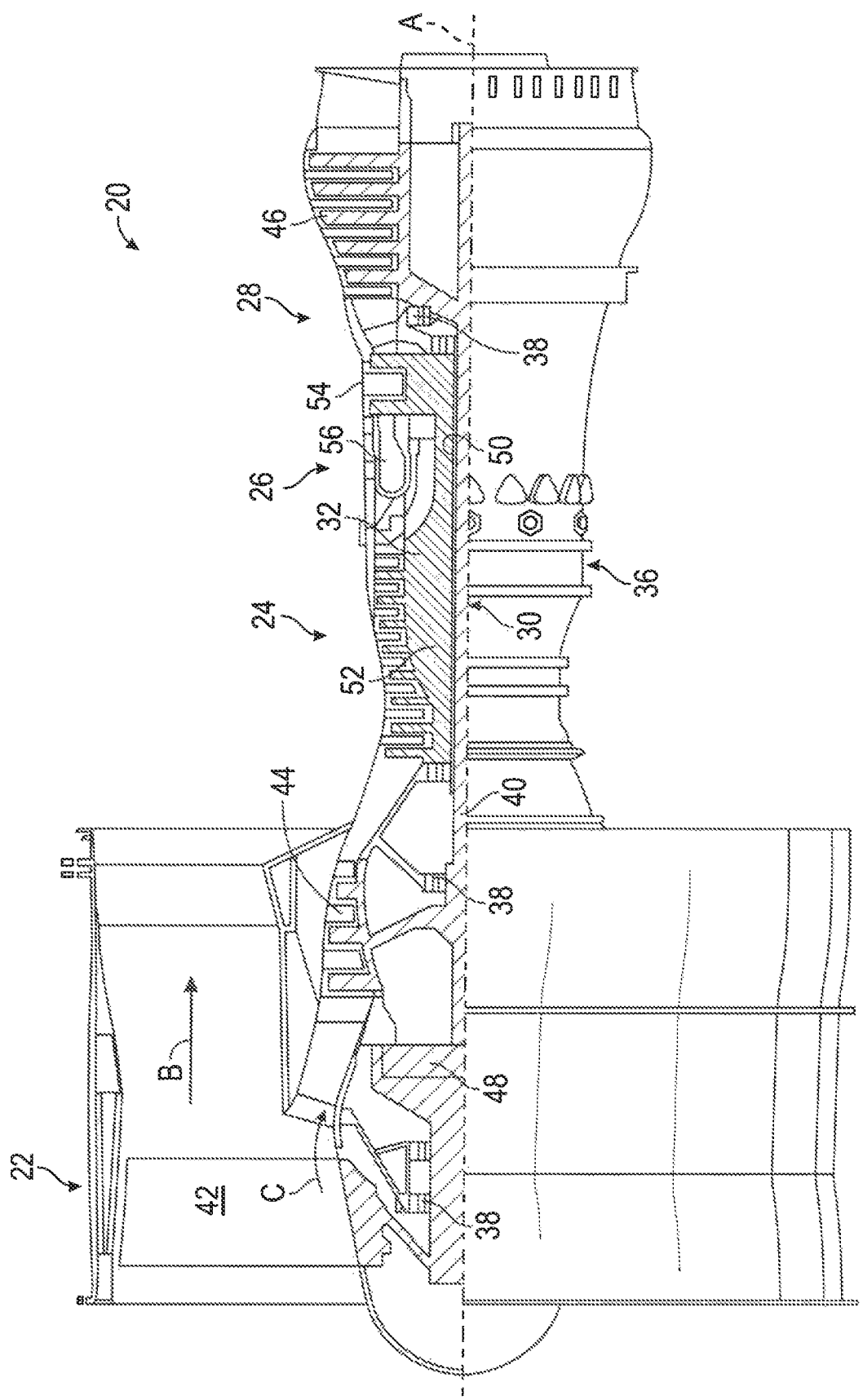
FIG. 1 is cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including, for example, one spool or three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1150 ft/second (350.5 m/sec).

Figure 2:
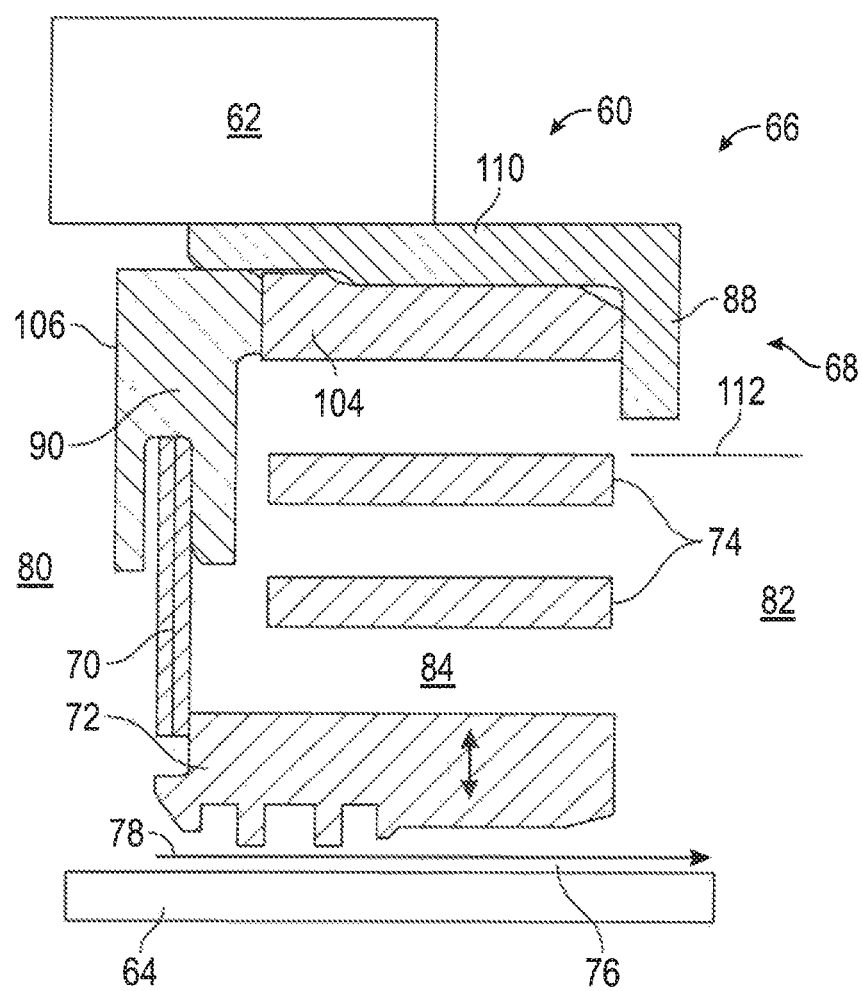
FIG. 2 is a cross-sectional view of an embodiment of a hydrostatic seal assembly for a gas turbine engine.

Referring now to FIG. 2, an embodiment of a seal 60 between a turbine stator 62 and a turbine rotor 64 is shown. The turbine rotor 64 is configured to rotate about the engine central longitudinal axis A relative to the turbine stator 62. While the description herein relates to sealing between a turbine stator and a turbine rotor, one skilled in the art will readily appreciate that the present disclosure may be readily applied at other locations of the gas turbine engine to provide sealing between a rotating component and a stationary component.

Figure 3:
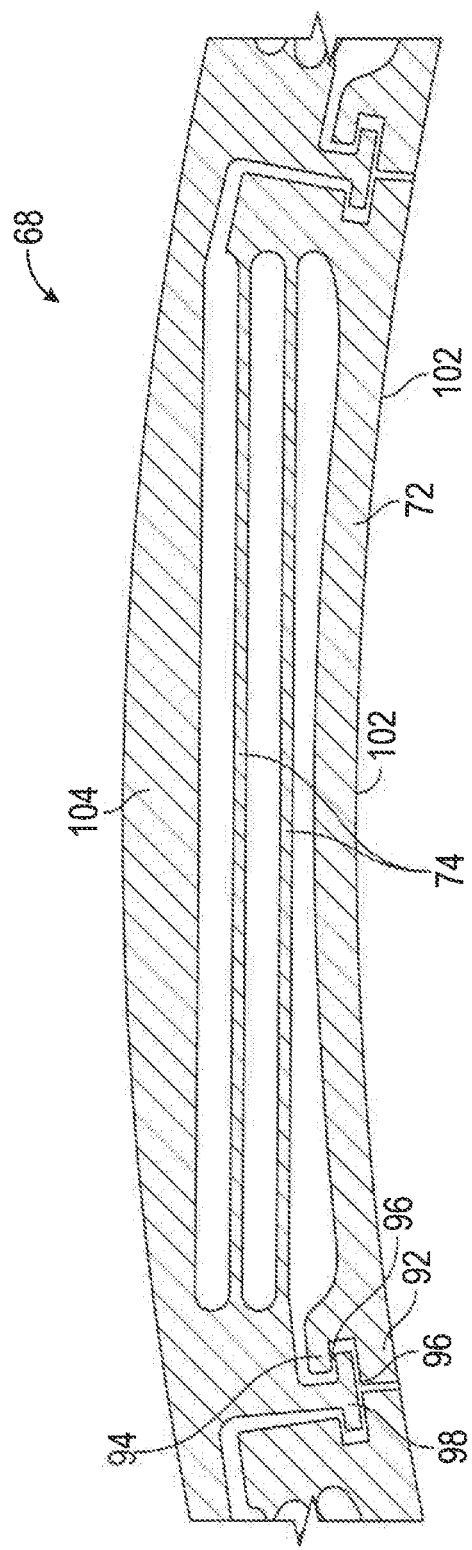
FIG. 3 is another cross-sectional view of an embodiment of a hydrostatic seal assembly.

The seal 60 is fixed to the turbine stator 62 via a seal carrier 66 and includes a primary seal 68 and one or more secondary seals 70. The primary seal 68 includes a seal support 104, which supports a seal shoe 72 via one or more seal beams 74 which, as shown best in FIG. 3, are configured as spring elements integral with the seal support 104 and the seal shoe 72. Referring again to FIG. 2, the seal shoe 72 is radially moveable relative to the seal support 104, and radially the toward the turbine stator 62 and radially away from the turbine stator 62 to maintain a desired air gap 76 between the turbine rotor 64 and the seal shoe 72.

In operation, an airflow 78 flows through the air gap 76 from a high pressure area 80 upstream of the seal 60 toward a low pressure area 82 downstream of the seal 60. Further, airflow enters a seal cavity 84 radially outboard of the seal shoe 72. The secondary seals 70 are located upstream of the seal shoe 72 and in some embodiments abut the seal shoe 72. The secondary seal 70 prevents airflow from entering the seal cavity 84 from the high pressure area 80 and/or prevents airflow from exiting the seal cavity 84 via an upstream side of the seal 60. In some embodiments, the secondary seals 70 are axially retained at the seal shoe 72 by a secondary seal cover 106 upstream of the secondary seals 70. Further, a radial and axial position of the secondary seal 70 may be maintained by a spacer 90. The seal shoe 72 moves radially until a pressure equilibrium between the air gap 76 and the seal cavity 84 is reached.

Referring again to FIG. 3, the primary seal 68 has a plurality of circumferentially spaced and segmented seal shoes 72. The radial travel or movement of the seal shoes 72 is limited by features of the primary seal 68. For example, in some embodiments, the seal shoe includes a radially inboard stop 92 and a radially outboard stop 94 separated by an arm gap 96. A seal shoulder 98 of the primary seal 68 is disposed in the arm gap 96. Radial clearance between the seal shoulder 98 and the radially inboard stop 92 limits radially outward travel or movement of the seal shoe 72, while radial clearance between the seal shoulder 98 and the radially outboard stop 94 limits radially inward travel or movement of the seal shoe 72.

Figure 4:
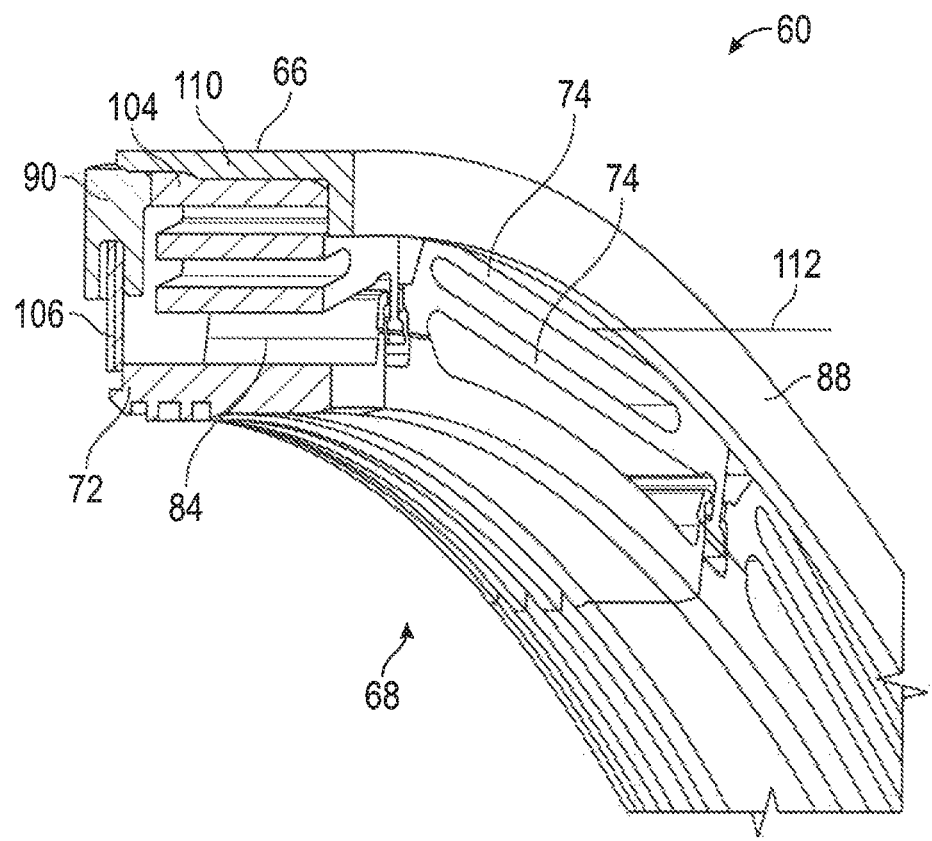
FIG. 4 is a partial perspective view of an embodiment of a hydrostatic seal assembly.

Referring again to FIG. 2, the seal carrier 66 includes a radially outer wall 110 to radially retain the primary seal 68, and in some embodiments an aft wall 88. The aft wall 88 extends radially inwardly from the radially outer wall 110 to retain the seal support 104. The aft wall 88 does not, however, extend radially inwardly to a seal shoe or seal beam radial location 112, as also shown in FIG. 4. Such a configuration and removes the contact and wear surface of a typical hydrostatic seal shoe 72 and seal beams 74, such that the seal shoe 72 and seal beams 74 have no axial contact with other components at the low pressure area 82 downstream of the seal 60. In some embodiments, the seal shoe 72 and/or the seal beams 74 are axially widened to increase axial stiffness thereby limiting axial deflection of the seal shoe 72. In some embodiments, the aft wall 88 is eliminated, and the seal carrier 66 may include only the radially outer wall 110.

The hydrostatic seal 60 configurations disclosed herein eliminate wear of the seal shoes 72 and seal beams 74 and eliminates frictional load and binding of the seal shoes 72 allowing for improved responsiveness of the seal shoe 72 to aerodynamic loading.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hydrostatic seal assembly, comprising:
    a primary seal configured to maintain a selected gap between the primary seal and a rotating component, the primary seal including:
        a seal support;
        a seal shoe; and
        one or more seal beams operably connecting the seal support to the seal shoe, the one or more seal beams configured as spring elements integral with the seal shoe to allow radial movement of the seal shoe relative to the seal support; and
    a seal carrier including:
        a radial outer wall configured to radially position the primary seal, the seal carrier configured for a non-contact relationship with the seal shoe during operation of the hydrostatic seal assembly; and
        an aft wall extending radially inwardly from the radial outer wall;
        wherein the aft wall does not radially overlap the one or more seal beams.

2. The hydrostatic seal of claim 1, wherein the aft wall does not extend radially inwardly to a seal shoe radial position.

3. The hydrostatic seal of claim 1, wherein the radial outer wall and the aft wall are formed as a single unitary component.

4. The hydrostatic seal of claim 1, wherein the aft wall is disposed at a first axial end of the seal support and a secondary seal is disposed at a second end of the seal support opposite the first axial end.

5. The hydrostatic seal of claim 1, wherein the seal carrier is configured for a non-contact relationship with one or more seal beams during operation of the hydrostatic seal assembly.

6. The hydrostatic seal of claim 1, including one or more stops formed in the seal shoe configured to limit radial travel of the seal shoe.

7. A turbine section of a gas turbine engine, comprising:
  a turbine stator;
  a turbine rotor configured to rotate about an engine central longitudinal axis relative to the turbine stator; and
  a hydrostatic seal assembly fixed to the turbine stator comprising:
    a primary seal configured to maintain a selected gap between the primary seal and the turbine rotor, the primary seal including:
      a seal support;
      a seal shoe; and
      one or more seal beams operably connecting the seal support to the seal shoe, the one or more seal beams configured as spring elements integral with the seal shoe to allow radial movement of the seal shoe relative to the seal support; and
    a seal carrier including:
      a radial outer wall configured to radially position the primary seal, the seal carrier configured for a non-contact relationship with the seal shoe during operation of the hydrostatic seal assembly; and
      an aft wall extending radially inwardly from the radial outer wall;
      wherein the aft wall does not radially overlap the one or more seal beams.

8. The turbine section of claim 7, wherein the aft wall does not extend radially inwardly to a seal shoe radial position.

9. The turbine section of claim 7, wherein the radial outer wall and the aft wall are formed as a single unitary component.

10. The turbine section of claim 7, wherein the aft wall is disposed at a first axial end of the seal support and a secondary seal is disposed at a second end of the seal support opposite the first axial end.

11. The turbine section of claim 7, wherein the seal carrier is configured for a non-contact relationship with one or more seal beams during operation of the hydrostatic seal assembly.

12. The turbine section of claim 7, including one or more stops formed in the seal shoe configured to limit radial travel of the seal shoe.

13. A gas turbine engine, comprising:
  a combustor;
  a turbine section in fluid communication with the combustor, the turbine section comprising:
    a turbine stator;
    a turbine rotor configured to rotate about an engine central longitudinal axis relative to the turbine stator; and
    a primary seal configured to maintain a selected gap between the primary seal and the turbine rotor, the primary seal including:
      a seal support;
      a seal shoe; and
      one or more seal beams operably connecting the seal support to the seal shoe, the one or more seal beams configured as spring elements integral with the seal shoe to allow radial movement of the seal shoe relative to the seal support; and
    a seal carrier including:
      a radial outer wall configured to radially position the primary seal, the seal carrier configured for a non-contact relationship with the seal shoe during operation of the hydrostatic seal assembly; and
      an aft wall extending radially inwardly from the radial outer wall;
      wherein the aft wall does not radially overlap the one or more seal beams.

14. The gas turbine engine of claim 13, wherein the aft wall does not extend radially inwardly to a seal shoe radial position.

15. The gas turbine engine of claim 13, wherein the radial outer wall and the aft wall are formed as a single unitary component.

16. The gas turbine engine of claim 13, wherein the aft wall is disposed at a first axial end of the seal support and a secondary seal is disposed at a second end of the seal support opposite the first axial end.

17. The gas turbine engine of claim 13, wherein the seal carrier is configured for a non-contact relationship with one or more seal beams during operation of the hydrostatic seal assembly.

* * * * *